March 22, 1932.   C. C. FARMER   1,850,621
BRAKE APPLICATION VALVE
Filed Jan. 21, 1930
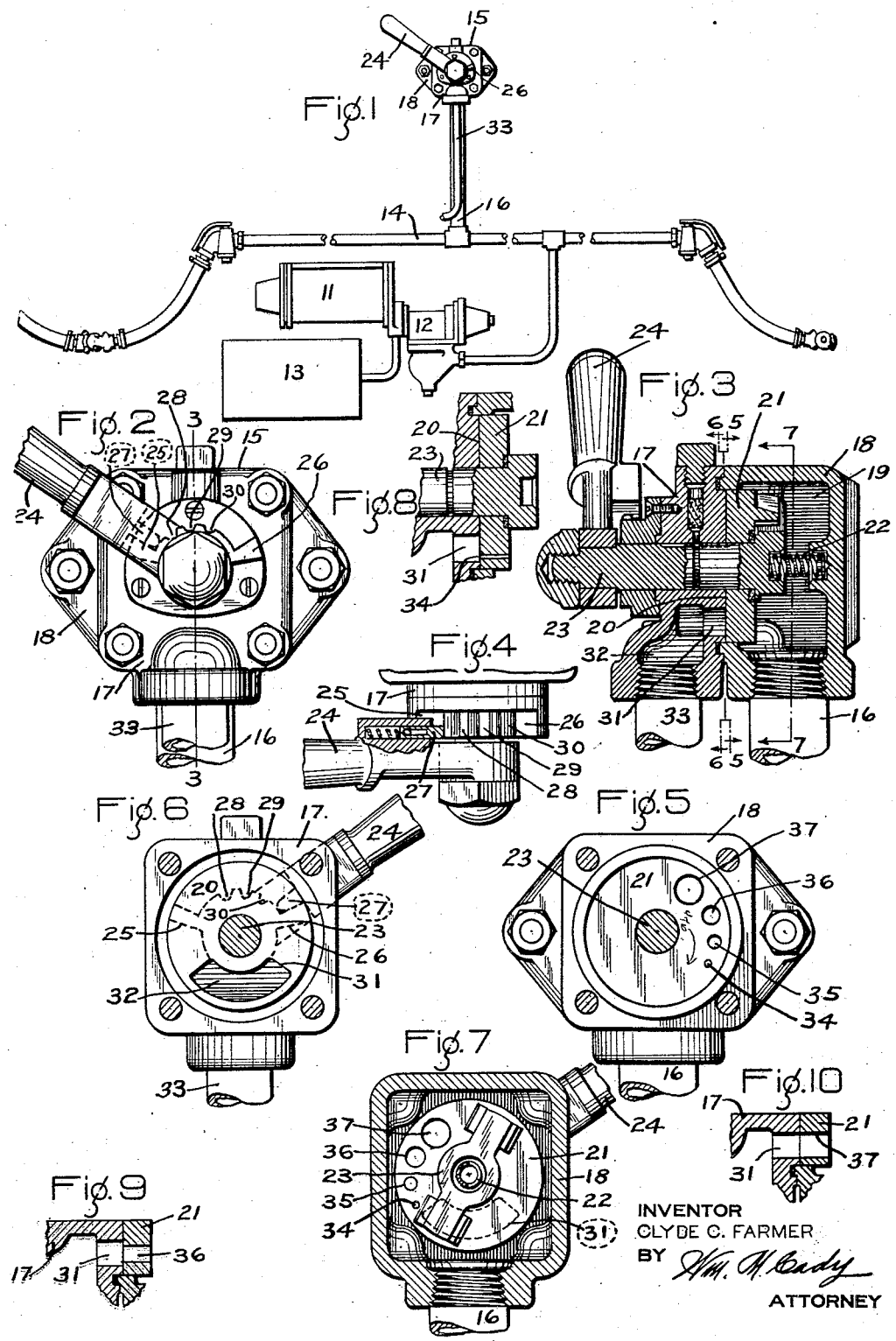
INVENTOR
CLYDE C. FARMER
BY
ATTORNEY Patented Mar. 22, 1932

1,850,621

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE APPLICATION VALVE

Application filed January 21, 1930. Serial No. 422,318.

This invention relates to fluid pressure brakes, and more particularly to a brake application valve device adapted to be mounted on a caboose or other car of a train to enable a trainman to effect an application of the brakes independently of the engineman.

An object of the invention is to provide an improved brake application valve device by which various rates in the reduction in brake pipe pressure can be effected without the use of a relay valve device.

Another object of the invention is to provide a brake application valve device having a rotary valve which is formed with a plurality of ports of various areas which are adapted to be successively brought into registration with a single atmospheric vent port for effecting service and emergency applications of the brakes.

Another object of the invention is to provide a brake application valve device comprising a rotary valve having a series of ports which are graduated in size so that the port at one end of the series is much smaller than the port at the other end, the valve ports being adapted to be successively brought into registration with a single atmospheric vent port having a sufficient length to accommodate all of the valve ports and a width as wide as the largest valve port.

Another object of the invention is to provide a brake application valve device of the above type, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a diagrammatic view illustrating a car brake apparatus with my improvement applied thereto; Fig. 2 is an enlarged elevation of the brake application valve device shown in Fig. 1; Fig. 3 is a vertical transverse section taken on the line 3—3 of Fig. 2; Fig. 4 is a plan of a portion of the structure shown in Fig. 2, illustrating the operating handle locking means; Fig. 5 is a vertical section taken on the line 5—5 of Fig. 3, looking in the direction of the arrows and showing the seat face of the rotary valve; Fig. 6 is a vertical section taken on the line 6—6 of Fig. 3, looking in the direction of the arrows and showing the valve seat; Fig. 7 is a vertical section taken on the line 7—7 of Fig. 3, showing the manner of connecting the rotary valve to its shaft; and Figs. 8, 9 and 10 are detail sections through the rotary valve and its seat, illustrating the manner in which the valve ports register with the vent port in the valve seat.

Referring to the drawings, the car brake apparatus shown in Fig. 1 comprises the usual brake cylinder 11, triple valve device 12, auxiliary reservoir 13, and train pipe 14 connected up in the usual manner. In its preferred form, the improved brake application valve device 15 is connected to the train pipe 14 by a pipe 16.

As shown in Figs. 2 to 10 inclusive, the valve device 15 comprises a casing which may be composed of a plurality of sections 17 and 18. The section 18 is formed with a valve chamber 19 connected to the pipe 16, while the section 17 has a seat 20 formed on its inner face for a rotary valve 21 mounted in the chamber 19. The valve 21 is maintained against the seat 20 by a spring 22.

For the purpose of actuating the valve 21, a shaft 23 is provided. This shaft is keyed to the valve 21 in the manner shown in Figs. 3 and 7, and it is journalled in the section 17. The end of the shaft 23 projecting from the casing has affixed thereto an operating handle 24.

The movement of the handle in either direction is limited by a pair of spaced projections or stops 25 and 26, which are formed on the outer face of the section 17. These projections or stops are disposed in the path of a spring-pressed pin 27, carried by the handle 24 (see Figs. 2 and 4).

Between the projections or stops 25 and 26, the outer face of the section 17 is formed with a plurality of spaced notches 28, 29 and 30. These notches are adapted to receive the spring-pressed pin 27 when the handle is operated and to thus lock the handle and the parts operated thereby in several positions intermediate the end stops 26 and 25, for a purpose to be hereinafter more fully described.

An arcuate slot 31 is concentrically formed in the inner face of the section 17. This slot provides a port from the seat 20 to a chamber 32 in the section 17. The chamber 32 is connected to the atmosphere through a pipe 33.

The rotary valve 21 is formed with a series of openings 34, 35, 36 and 37 which are disposed in an arc so that when the valve is actuated the openings will be successively brought into registration with the slot 31. The openings are spaced apart a suitable distance so that all the openings will cover the slot 31 when the handle 24 is moved to its extreme right hand position.

In the present instance, the openings are shown as being of various sizes, so as to provide a series of ports in the valve 21 of various areas. Thus the opening 34, which is located at one end of the series, is much smaller than is the opening 37 at the other end of the series, while the intermediate openings 35 and 36 are respectively larger and smaller than the openings 34 and 37. As shown in Fig. 7, when the handle 24 is in the "off" position, the opening 34, which is nearest to the end of the slot 31, is out of registration with such slot, and communication will be cut off from the chamber 19 to the chamber 32.

In operation, when it is desired to apply the brakes, the operator moves the handle 24 from the position shown in Fig. 2 toward the right, thereby bringing the port 34 of the valve 21 into registration with the port 31. In this position, the spring-pressed pin 27 enters the notch 28. With the valve 21 so positioned, a restricted communication is provided through which fluid under pressure is permitted to flow gradually from the brake pipe 14 to the atmosphere, through pipe 16, chamber 19, ports 34 and 31, chamber 29 and pipe 30 (see Fig. 8), thereby effecting a service application of the brakes.

If it is desired to increase the rate of brake application, the rate of reduction of brake pipe pressure can be increased by moving the handle 24 further toward the right, so as to bring the larger ports of the valve 21 into registration with the valve seat port 31. The movement of the handle 24 toward the right will successively move the openings 35, 36 and 37 into registration with the valve seat port and the maximum rate of reduction in brake pipe pressure will be obtained when the handle 24 has been moved to its extreme right hand position, in which position all of the openings in the valve 21 will be registered with the port 31.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A valve device of the class described comprising a casing having a chamber, a rotary valve mounted in the chamber, a seat formed in the casing for the valve, a second chamber formed in the casing behind the valve seat, an arcuate opening of constant width formed in the casing between the valve seat and the second chamber, a plurality of spaced openings of varying areas formed in the valve, each opening being progressively larger than the smallest opening and arranged in an arc in the valve, said valve openings being so disposed in said valve that the opening of least area is adjacent to the opening in the valve seat when the device is in inoperative position, all of said valve openings being spaced apart a distance less than the length of the valve seat opening, each valve opening being adapted to provide a restricted communication of predetermined area from the first chamber to the second chamber according to the position of the valve with respect to the valve seat, and means for operating the valve to the position in which the smaller valve opening registers with the opening in the valve seat and to other positions in which the other valve openings are successively brought into registration with the valve seat opening so that the flow area through the valve is progressively increased.

In testimony whereof I have hereunto set my hand, this 17th day of January, 1930.

CLYDE C. FARMER.